(12) United States Patent
Yuan et al.

(10) Patent No.: US 10,422,944 B2
(45) Date of Patent: Sep. 24, 2019

(54) MULTI-STAGE OPTICAL WAVEGUIDE FOR A LUMINAIRE

(71) Applicant: Cree, Inc., Durham, NC (US)

(72) Inventors: Zongjie Yuan, Libertyville, IL (US);
Kurt S. Wilcox, Libertyville, IL (US);
Christopher D. Strom, Racine, WI (US)

(73) Assignee: IDEAL INDUSTRIES LIGHTING LLC, Sycamore, IL (US)

( * ) Notice: Subject to any disclaimer, the term of this patent is extended or adjusted under 35 U.S.C. 154(b) by 36 days.

(21) Appl. No.: 14/726,152

(22) Filed: May 29, 2015

(65) Prior Publication Data

US 2015/0260905 A1    Sep. 17, 2015

Related U.S. Application Data

(63) Continuation-in-part of application No. 13/840,563, filed on Mar. 15, 2013, which is a
(Continued)

(51) Int. Cl.
*G02B 6/00* (2006.01)
*F21V 8/00* (2006.01)
(Continued)

(52) U.S. Cl.
CPC .............. *G02B 6/0076* (2013.01); *F21K 9/61* (2016.08); *F21S 8/026* (2013.01); *F21V 7/0091* (2013.01);
(Continued)

(58) Field of Classification Search
CPC .......... F21K 9/61; G02B 6/0075–0076; G02B 6/0033–0063; G02B 6/0076
See application file for complete search history.

(56) References Cited

U.S. PATENT DOCUMENTS

| 3,372,740 A | 3/1968 | Kastovich et al. |
| 5,398,179 A | 3/1995 | Pacheco |

(Continued)

FOREIGN PATENT DOCUMENTS

EP    2354640    8/2011

OTHER PUBLICATIONS

International Search Report and Written Opinion for International Application No. PCT/US15/32011, Applicant, Cree, Inc., dated Oct. 23, 2015 (13 pages).

(Continued)

*Primary Examiner* — Gerald J Sufleta, II
(74) *Attorney, Agent, or Firm* — Myers Bigel, P.A.

(57) ABSTRACT

According to one aspect, an optical waveguide includes a first waveguide portion and a second waveguide portion adjacent to and separate from the first waveguide portion. The waveguide portions include light coupling portions that are at least partially aligned and adapted to receive light developed by a light source. The first waveguide portion further has a first major surface with light direction features and a second major surface opposite the first major surface. The second waveguide portion further has a third major surface proximate the second major surface with an air gap disposed therebetween and a fourth major surface opposite the third major surface wherein the fourth major surface includes a cavity extending therein.

27 Claims, 11 Drawing Sheets

Related U.S. Application Data continuation-in-part of application No. 13/839,949, filed on Mar. 15, 2013, now Pat. No. 9,581,751.

(60) Provisional application No. 61/758,660, filed on Jan. 30, 2013.

(51) Int. Cl.

| | |
|---|---|
| *G02B 6/30* | (2006.01) |
| *G02B 6/32* | (2006.01) |
| *G02B 6/34* | (2006.01) |
| *G02B 6/24* | (2006.01) |
| *G02B 6/26* | (2006.01) |
| *F21S 8/02* | (2006.01) |
| *F21V 7/00* | (2006.01) |
| *F21K 9/61* | (2016.01) |

(52) U.S. Cl.
CPC ......... *G02B 6/0018* (2013.01); *G02B 6/0021* (2013.01); *G02B 6/0031* (2013.01); *G02B 6/0035* (2013.01); *G02B 6/0036* (2013.01); *G02B 6/0038* (2013.01); *G02B 6/0046* (2013.01); *G02B 6/24* (2013.01); *G02B 6/262* (2013.01); *G02B 6/305* (2013.01); *G02B 6/32* (2013.01); *G02B 6/34* (2013.01)

(56) References Cited

U.S. PATENT DOCUMENTS

| | | | |
|---|---|---|---|
| 5,537,304 A | 7/1996 | Klaus | |
| 5,613,770 A | 3/1997 | Chin, Jr. et al. | |
| 5,676,457 A | 10/1997 | Simon | |
| 5,685,634 A | 11/1997 | Mulligan | |
| 5,719,619 A | 1/1998 | Shono et al. | |
| 5,806,955 A | 9/1998 | Parkyn, Jr. et al. | |
| 5,839,823 A | 11/1998 | Hou et al. | |
| 5,863,113 A | 1/1999 | Oe et al. | |
| 6,257,737 B1 | 7/2001 | Marshall et al. | |
| 6,443,594 B1 | 9/2002 | Marshall et al. | |
| 6,554,451 B1 | 4/2003 | Keuper | |
| 7,008,097 B1 | 3/2006 | Hulse | |
| 7,090,370 B2 | 8/2006 | Clark et al. | |
| 7,393,124 B1 | 7/2008 | Williams | |
| 7,488,093 B1 | 2/2009 | Huang et al. | |
| 7,534,013 B1 | 5/2009 | Simon | |
| 7,566,159 B2 | 7/2009 | Oon et al. | |
| 7,587,117 B2 | 9/2009 | Winston et al. | |
| 7,593,615 B2 | 9/2009 | Chakmakjian et al. | |
| 7,628,508 B2 | 12/2009 | Kita et al. | |
| 7,635,205 B2 | 12/2009 | Yu et al. | |
| 7,641,363 B1 | 1/2010 | Chang et al. | |
| 7,736,019 B2 | 6/2010 | Shimada et al. | |
| 7,810,960 B1 | 10/2010 | Soderman et al. | |
| 7,813,131 B2 | 10/2010 | Liang | |
| 7,914,193 B2 | 3/2011 | Peifer et al. | |
| 7,967,477 B2 | 6/2011 | Bloemen et al. | |
| 8,087,807 B2 | 1/2012 | Liu et al. | |
| 8,096,671 B1 | 1/2012 | Cronk et al. | |
| 8,096,681 B2 | 1/2012 | Fang et al. | |
| 8,272,756 B1 | 9/2012 | Patrick | |
| 8,277,106 B2 | 10/2012 | Van Gorkom et al. | |
| 8,287,152 B2 | 10/2012 | Gill | |
| 8,317,366 B2 | 11/2012 | Dalton et al. | |
| 8,353,606 B2 | 1/2013 | Jeong | |
| 8,382,387 B1 | 2/2013 | Sandoval | |
| 8,408,737 B2 | 4/2013 | Wright et al. | |
| 8,419,224 B2 | 4/2013 | Wan-Chih et al. | |
| 8,434,892 B2 | 5/2013 | Zwak et al. | |
| 8,434,893 B2 | 5/2013 | Boyer et al. | |
| 8,449,128 B2 | 5/2013 | Ko et al. | |
| 8,449,142 B1 | 5/2013 | Martin et al. | |
| 8,469,559 B2 | 6/2013 | Williams | |
| 8,475,010 B2 | 7/2013 | Vissenberg et al. | |
| 8,485,684 B2 | 7/2013 | Lou et al. | |
| 8,547,022 B2 | 10/2013 | Summerford et al. | |
| 8,567,983 B2 | 10/2013 | Boyer et al. | |
| 8,573,823 B2 | 11/2013 | Dau et al. | |
| 8,585,253 B2 | 11/2013 | Duong et al. | |
| 8,593,070 B2 | 11/2013 | Wang et al. | |
| 8,608,351 B2 | 12/2013 | Peifer | |
| 9,099,592 B2 | 8/2015 | Derryberry et al. | |
| 2002/0018350 A1* | 2/2002 | Lepley | G02B 6/0001 362/551 |
| 2004/0146241 A1 | 7/2004 | Deladurantaye et al. | |
| 2007/0115569 A1 | 5/2007 | Tang et al. | |
| 2008/0002399 A1 | 1/2008 | Villard et al. | |
| 2010/0202142 A1* | 8/2010 | Morgan | F21S 11/00 362/235 |
| 2010/0238671 A1 | 9/2010 | Catone et al. | |
| 2010/0301360 A1 | 12/2010 | Van De Ven et al. | |
| 2010/0302783 A1 | 12/2010 | Shastry et al. | |
| 2010/0315833 A1 | 12/2010 | Holman et al. | |
| 2011/0044022 A1 | 2/2011 | Ko et al. | |
| 2011/0187273 A1 | 8/2011 | Summerford et al. | |
| 2011/0233568 A1 | 9/2011 | An et al. | |
| 2011/0305027 A1 | 12/2011 | Ham | |
| 2011/0317436 A1 | 12/2011 | Kuan | |
| 2012/0019942 A1 | 1/2012 | Morgan | |
| 2012/0026728 A1 | 2/2012 | Lou et al. | |
| 2012/0152490 A1 | 6/2012 | Wen et al. | |
| 2012/0287654 A1 | 11/2012 | He et al. | |
| 2012/0287677 A1 | 11/2012 | Wheatley et al. | |
| 2012/0307496 A1 | 12/2012 | Phillips et al. | |
| 2013/0003363 A1 | 1/2013 | Lu et al. | |
| 2013/0044497 A1* | 2/2013 | Sakamoto | G02B 6/0008 362/311.04 |
| 2013/0088890 A1 | 4/2013 | Knapp et al. | |
| 2013/0107528 A1 | 5/2013 | Boyer et al. | |
| 2013/0128593 A1 | 5/2013 | Luo | |
| 2013/0170210 A1 | 7/2013 | Athalye | |
| 2013/0201715 A1 | 8/2013 | Dau et al. | |
| 2013/0215612 A1 | 8/2013 | Garcia | |
| 2013/0229804 A1 | 9/2013 | Holder et al. | |
| 2013/0250584 A1 | 9/2013 | Wang et al. | |
| 2013/0294063 A1 | 11/2013 | Lou et al. | |
| 2013/0300310 A1 | 11/2013 | Hu et al. | |
| 2013/0343045 A1 | 12/2013 | Lodhie et al. | |
| 2013/0343055 A1 | 12/2013 | Eckert et al. | |
| 2013/0343079 A1 | 12/2013 | Unger et al. | |
| 2014/0029257 A1 | 1/2014 | Boyer et al. | |
| 2015/0055369 A1 | 2/2015 | Tarsa et al. | |
| 2015/0055371 A1 | 2/2015 | van de Ven et al. | |
| 2015/0160396 A1 | 6/2015 | Wilcox et al. | |
| 2015/0253488 A1 | 9/2015 | Wilcox et al. | |
| 2015/0285980 A1* | 10/2015 | Preston | G02B 6/0008 362/555 |
| 2015/0323142 A1* | 11/2015 | Shigematsu | F21K 9/61 362/235 |

OTHER PUBLICATIONS

International Search Report and Written Opinion for International Application No. PCT/US15/32210, Applicant, Cree, Inc., dated Oct. 26, 2015 (19 pages).

* cited by examiner

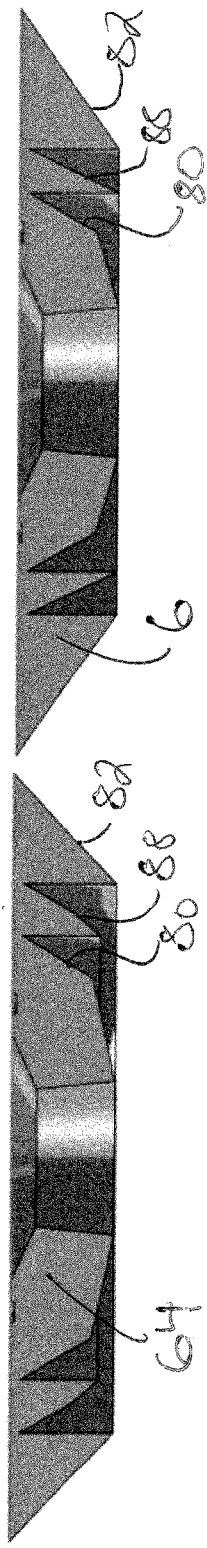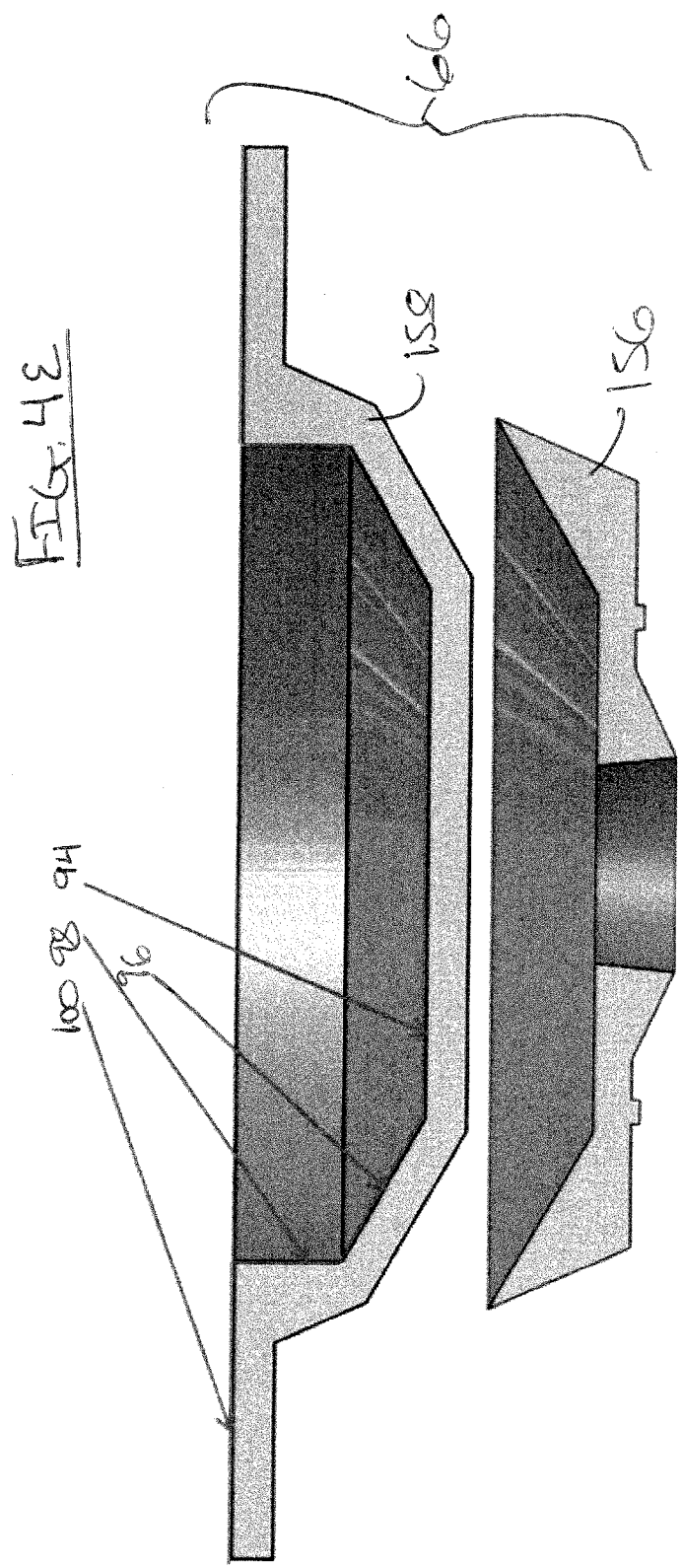

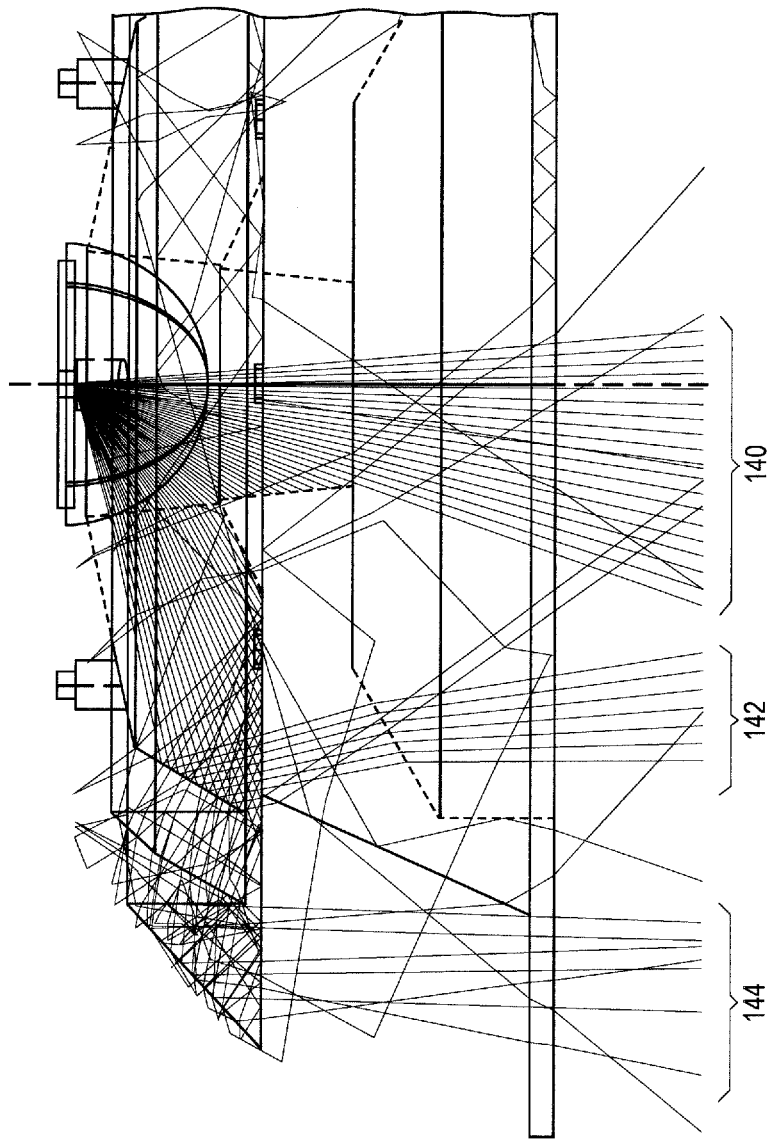

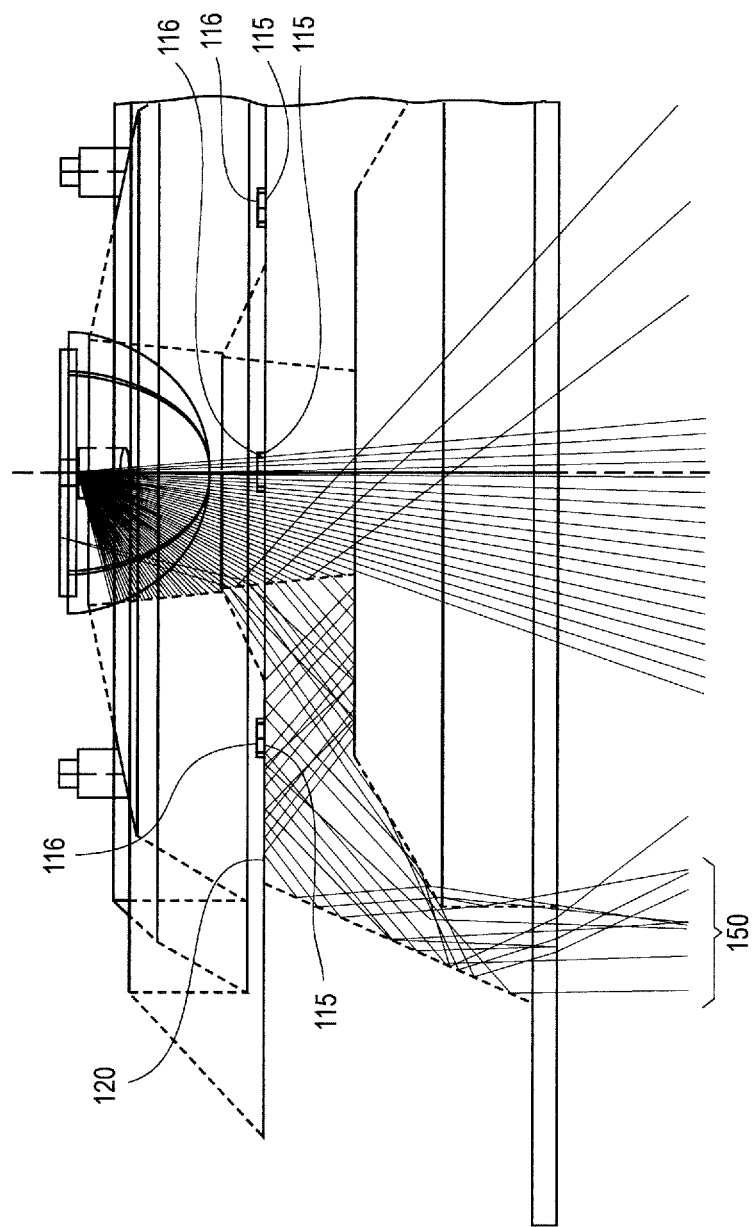

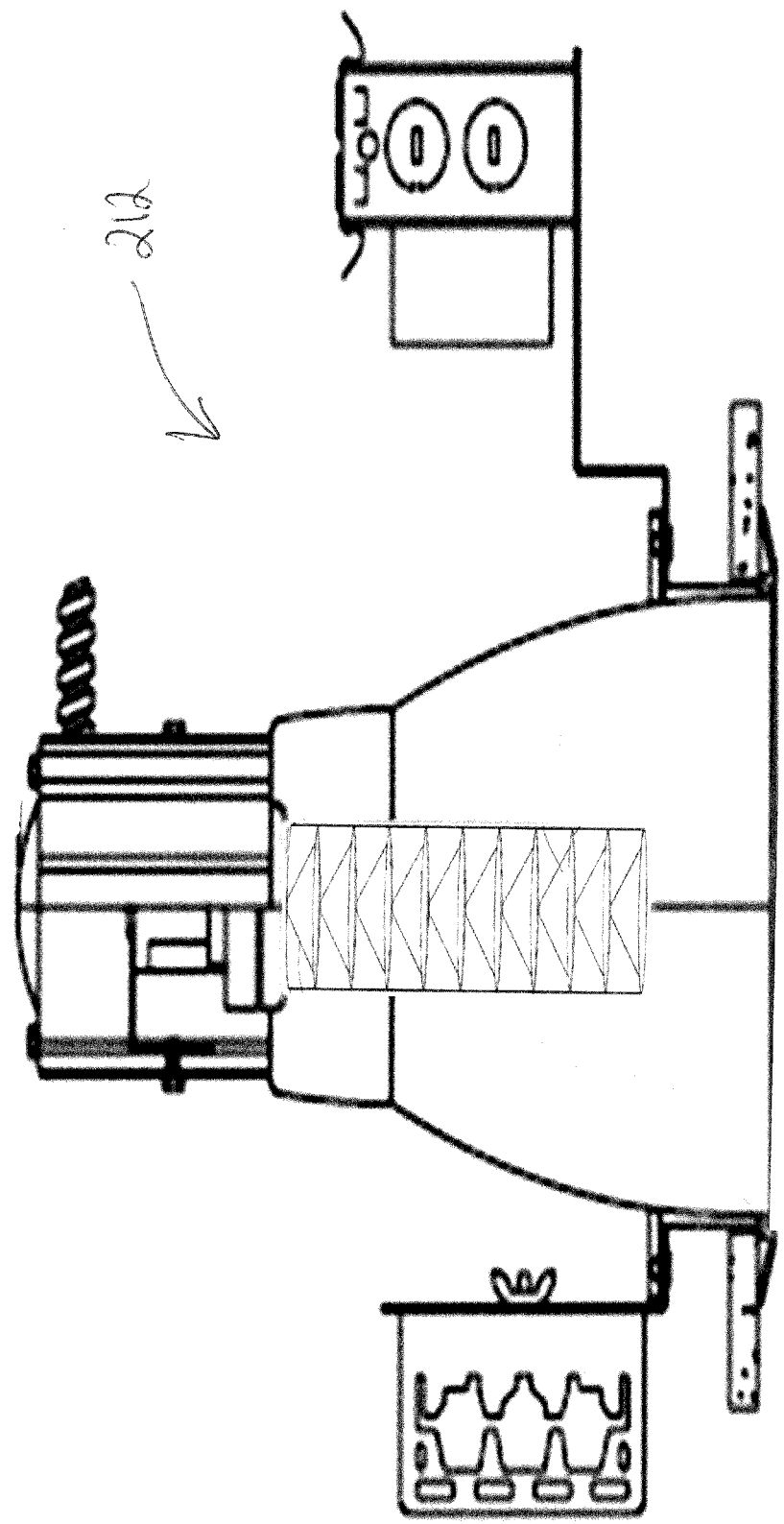

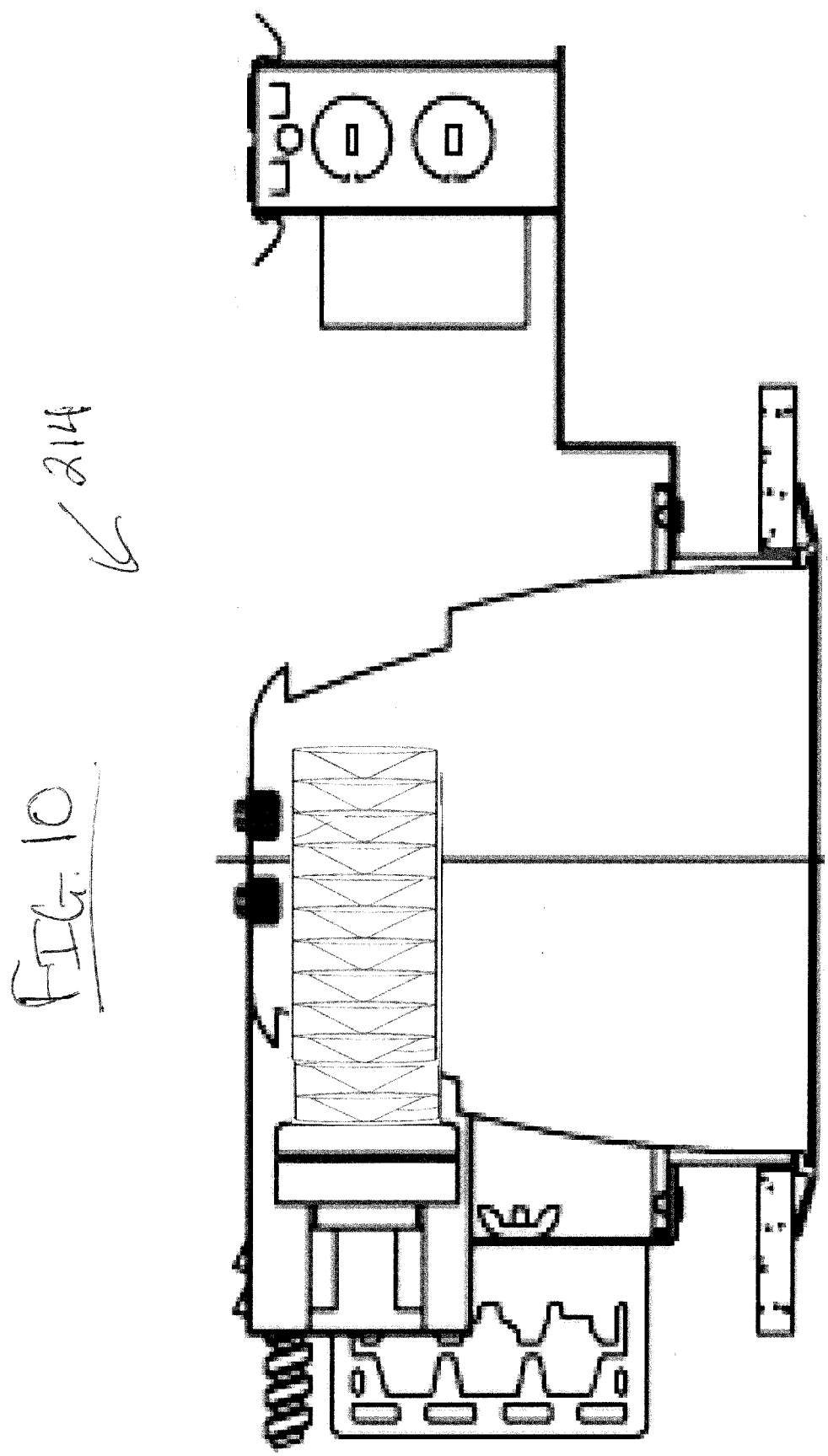

MULTI-STAGE OPTICAL WAVEGUIDE FOR A LUMINAIRE

CROSS REFERENCE TO RELATED APPLICATIONS

The present application is a continuation-in-part of U.S. Non-Provisional patent application Ser. No. 13/840,563, filed Mar. 15, 2013, which claims the benefit of U.S. Provisional patent application Ser. No. 61/758,660, filed Jan. 30, 2013, entitled "Optical Waveguide" and owned by the assignee of the present application. The present application is a continuation-in-part of U.S. Non-Provisional patent application Ser. No. 13/839,949, filed Mar. 15, 2013, which claims the benefit of U.S. Provisional patent application Ser. No. 61/758,660, filed Jan. 30, 2013 entitled "Optical Waveguide and Lamp Including Same" and owned by the assignee of the present application.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to lighting devices, and more particularly, to a luminaire incorporating an optical waveguide having multiple stages.

BACKGROUND

An optical waveguide mixes and directs light emitted by one or more light sources, such as one or more light emitting diodes (LEDs). A typical optical waveguide includes three main components: one or more coupling surfaces or elements comprising a coupling optic, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light into the waveguide. The coupling element of a waveguide may be comprised of one or more of a number of optical elements, including a 'primary' source optic (such as the lens on an LED component package), one or more intermediate optical elements (such as a lens or array of lenses) interposed between the source and the waveguide coupling surface or surfaces, one or more reflective or scattering surfaces surrounding the sources, and specific optical geometries formed in the waveguide coupling surfaces themselves. Proper design of the elements that comprise the coupling element can provide control over the spatial and angular spread of light within the waveguide (and thus how the light interacts with the extraction elements), maximize the coupling efficiency of light into the waveguide, and improve the mixing of light from various sources within the waveguide (which is particularly important when the color from the sources varies—either by design or due to normal bin-to-bin variation in lighting components). The elements of the waveguide coupling system can use refraction, reflection, total internal reflection, and surface or volume scattering to control the distribution of light injected into the waveguide.

To increase the coupling of light from a light source into a waveguide, it is desirable to maximize the number of light rays emitted by the source(s) that impinge directly upon the waveguide coupling surface. Light rays that are not directly incident on the waveguide from the source must undergo one or more reflections or scattering events prior to reaching the waveguide coupling surface. Each such ray is subject to absorption at each reflection or scattering event, leading to light loss and inefficiencies. Further, each ray that is incident on the coupling surface has a portion that is reflected (Fresnel reflection) and a portion that is transmitted into the waveguide. The percentage that is reflected is smallest when the ray strikes the coupling surface at an angle of incidence relative to the surface normal close to zero (i.e., approximately normal to the surface). The percentage that is reflected is largest when the ray is incident at a large angle relative to the surface normal of the coupling surface (i.e., approximately parallel to the surface). To increase efficiency, the coupling of the light into the waveguide body minimizes the absorption of light at reflection or scattering events as well as the Fresnel reflection at the coupling surface.

In conventional coupling, a light source, typically emitting a Lambertian distribution of light, is positioned adjacent to the edge of a planar waveguide element. Alternatively, each light source comprising an LED may be positioned in a cylindrical coupling cavity within the waveguide, and a reflective cap having a cone-shaped plug diverter may be placed at the opposite end of the coupling cavity, as described in copending U.S. patent application Ser. No. 13/839,949, filed Mar. 15, 2013, entitled "Optical Waveguide and Lamp Including Same," U.S. patent application Ser. No. 14/101,086, filed Dec. 9, 2013, entitled "Optical Waveguides and Luminaires Incorporating Same," U.S. patent application Ser. No. 14/101,132, filed Dec. 9, 2013, entitled "Waveguide Bodies Including Redirection Features and Methods of Producing Same," and U.S. patent application Ser. No. 14/101,147, filed Dec. 9, 2013, entitled "Luminaires Using Waveguide Bodies and Optical Elements". This type of coupling configuration can greatly increase the portion of light emitted by the source that is directly incident on the waveguide coupling surface, leading to improved coupling efficiency. However, by its nature such coupling requires discrete sources spaced remotely across a waveguide. Such discrete source placement can have advantages for thermal management of heat generated by the LED sources, but can also lead to increased cost compared to arrangements where the LED sources are all affixed to a single printed circuit board. Additionally, steps must be taken to prevent inadequate color mixing that would otherwise lead to non-uniform appearance in the luminance of the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflection light traveling through a waveguide is reflected back into or escapes from the waveguide at an outer surface thereof, depending upon the angle of incidence of the light with the surface. Specifically, the light rays continue to travel through the waveguide until such rays strike an index interface surface at a particular angle less than an angle measured with respect to a line normal to the surface point at which the light rays are incident (or, equivalently, until the light rays exceed an angle measured with respect to a line tangent to the surface point at which the light rays are incident) and the light rays escape.

In order for an extraction element to remove light from the waveguide, the light must first contact the feature comprising the element. By appropriately shaping the waveguide surfaces, one can control the flow of light across the extraction feature(s) and thus influence both the position from which light is emitted and the angular distribution of the emitted light. Specifically, the design of the coupling and distribution surfaces, in combination with the spacing (distribution), shape, and other characteristic(s) of the extraction features provides control over the appearance of the waveguide (luminance), its resulting light distribution (illuminance), and system optical efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face.

Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light-emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting. A quasi-point source develops light that is collimated in a radially outward direction and exit means of distribution optics direct the collimated light out of the optics.

Kelly et al. U.S. Pat. No. 8,430,548 discloses light fixtures that use a variety of light sources, such as an incandescent bulb, a fluorescent tube, and multiple LEDs. A volumetric diffuser controls the spatial luminance uniformity and angular spread of light from the light fixture. The volumetric diffuser includes one or more regions of volumetric light scattering particles. The volumetric diffuser may be used in conjunction with a waveguide to extract light.

Dau et al U.S. Pat. No. 8,506,112 discloses illumination devices having multiple light emitting elements, such as LEDs disposed in a row. A collimating optical element receives light developed by the LEDs and a light guide directs the collimated light from the optical element to an optical extractor, which extracts the light.

Smith U.S. Pat. Nos. 7,083,313 and 7,520,650 disclose a light direction device for use with LEDs. In one embodiment, the light direction device includes a plurality of opposing collimators disposed about a plurality of LEDs on one side of the device. Each collimator collimates light developed by the LEDs and directs the collimated light through output surfaces of the collimators toward angled reflectors disposed on a second side opposite the first side of the device. The collimated light reflects off the reflectors out of from the one side perpendicular thereto. In another embodiment, the collimators are integral with a waveguide having reflective surfaces disposed on a second side of the waveguide, and the collimated light is directed toward the reflective surfaces. The light incident on the reflective surfaces is directed from the one side of the device, as in the one embodiment.

Jenkins et al. U.S. Pat. No. 6,097,549 discloses a bireflective lens element having a spaced first and second lens elements that together develop output light in a substantially uniform or desired pattern.

SUMMARY

According to one aspect, an optical waveguide includes a first waveguide portion and a second waveguide portion adjacent to and separate from the first waveguide portion. The waveguide portions include light coupling portions that are at least partially aligned and adapted to receive light developed by a light source. The first waveguide portion further has a first major surface with light direction features and a second major surface opposite the first major surface. The second waveguide portion further has a third major surface proximate the second major surface with an air gap disposed therebetween and a fourth major surface opposite the third major surface wherein the fourth major surface includes a cavity extending therein.

According to another aspect, an optical waveguide comprises first and second waveguide stages having first and second at least partially aligned interior light coupling cavities, respectively, first and second light transmission portions, respectively, separated from one another by an air gap, and first and second light extraction portions, respectively. The light transmission portion of each of the first and second waveguide stages is disposed between the interior light coupling cavity and the light extraction portion of such stage along a lateral dimension thereof. The light extraction portion of the first stage is disposed outside of the light extraction portion of the second stage along the lateral dimension of the second stage.

According to yet another aspect, a luminaire includes a housing and an optical waveguide disposed in the housing. The optical waveguide includes first and second stages each having a light coupling portion and a light extraction portion. A light source is also disposed in the housing and is adapted to develop light that is directly incident on both of the light coupling portions of the first and second stages. Light incident on the light coupling portions travels through the first and second stages and the light extraction portions direct light out of the stages.

According to still another aspect, an optical waveguide comprises a plurality of waveguide portions arranged in a stack with each waveguide portion having a coupling surface and a surface opposite the coupling surface. The coupling surface of a first waveguide portion is aligned with a light source and adapted to receive light developed by the light source and each next waveguide is aligned with each previous waveguide such that light escaping through the surface opposite the coupling surface of each previous waveguide is received by the coupling surface of the next waveguide.

Other aspects and advantages will become apparent upon consideration of the following detailed description and the attached drawings wherein like numerals designate like structures throughout the specification.

BRIEF DESCRIPTION OF THE DRAWINGS

FIGS. 4C and 4D are cross-sectional views of alternative embodiments of the first waveguide stage of FIG. 4;

FIG. 4E is a cross-sectional view of an alternative embodiment of the second waveguide stage of FIG. 4;

FIGS. 5 and 6 are ray trace diagrams simulating light passage through the waveguide stages of FIG. 2;

FIGS. 9 and 10 are sectional views of alternate embodiments of luminaires incorporating the multi-stage waveguide of FIG. 7.

DETAILED DESCRIPTION

Figure 1:
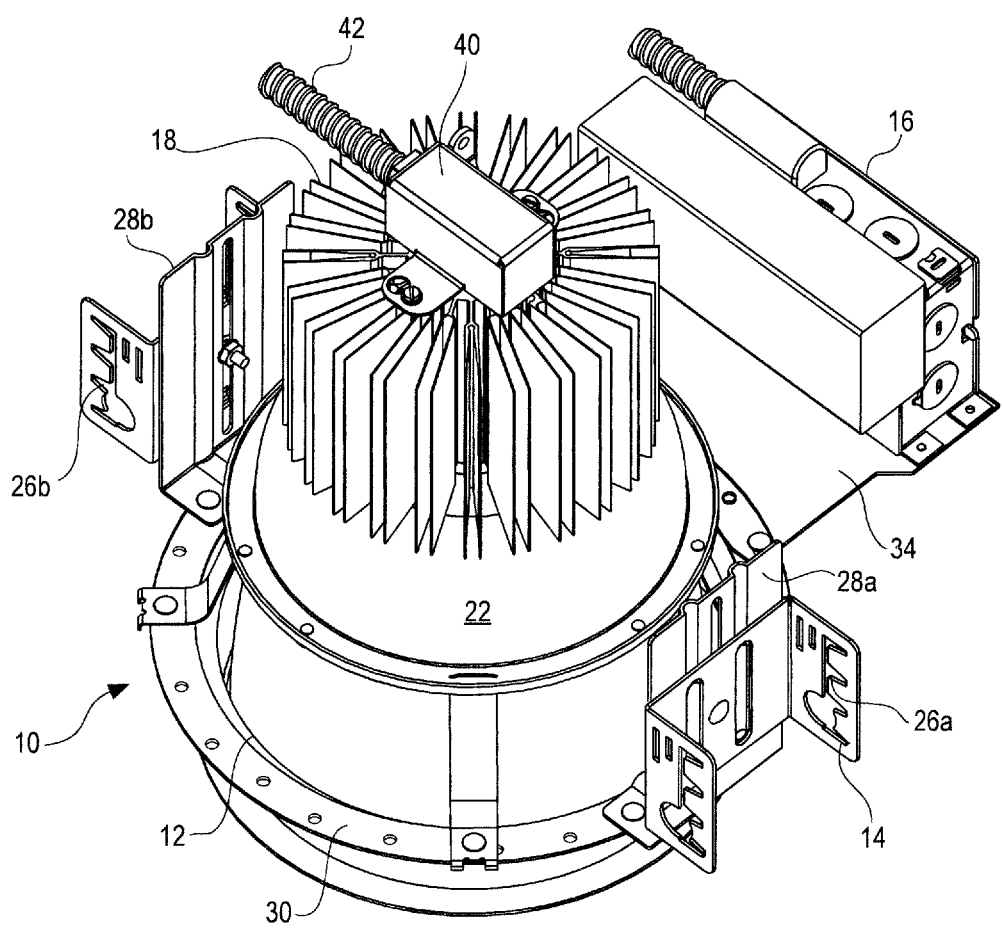
FIG. 1 is an isometric view of a luminaire incorporating an optical waveguide.
Figure 2:
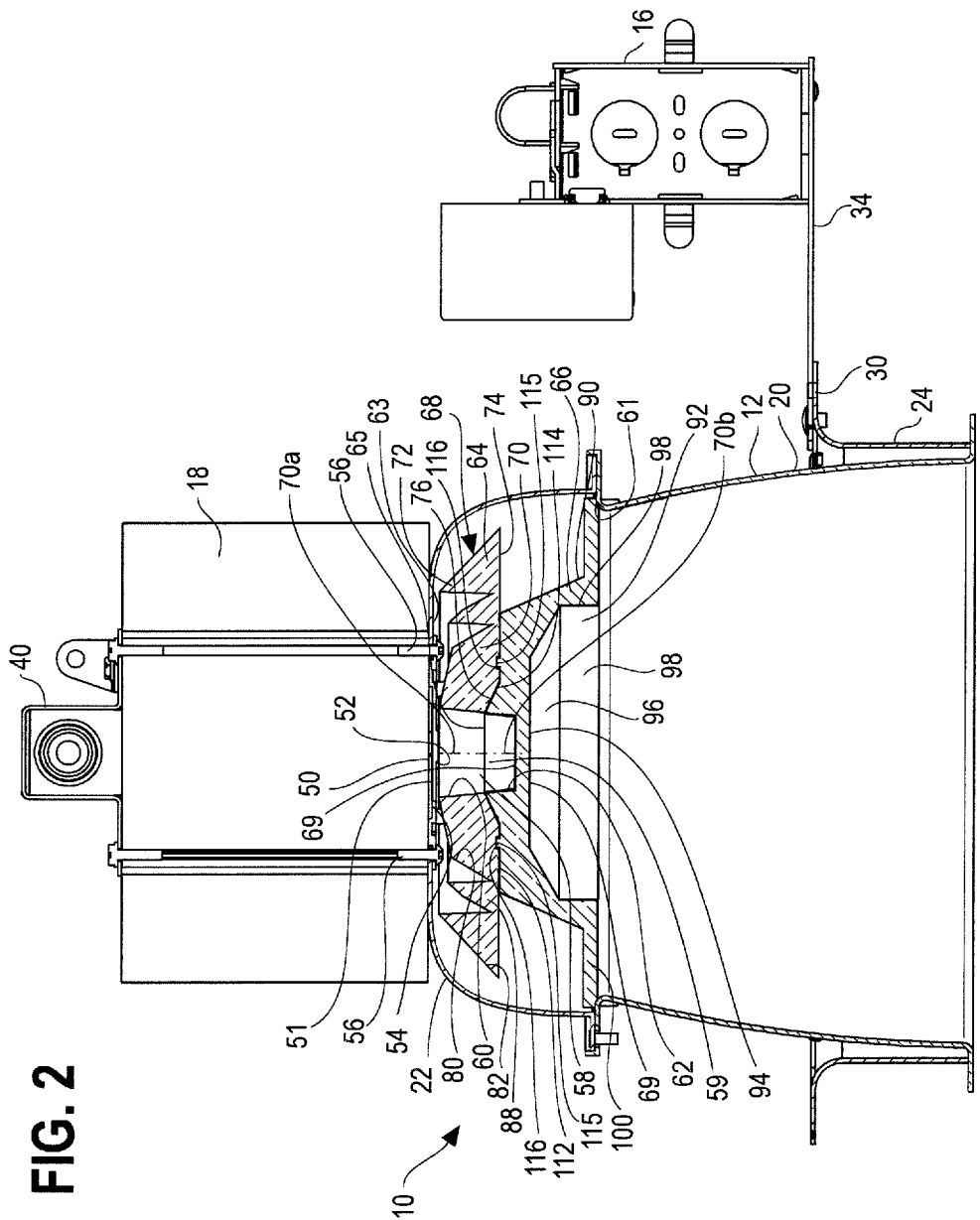
FIG. 2 is a sectional view taken generally along the lines 2-2 of FIG. 1.
Figure 3:
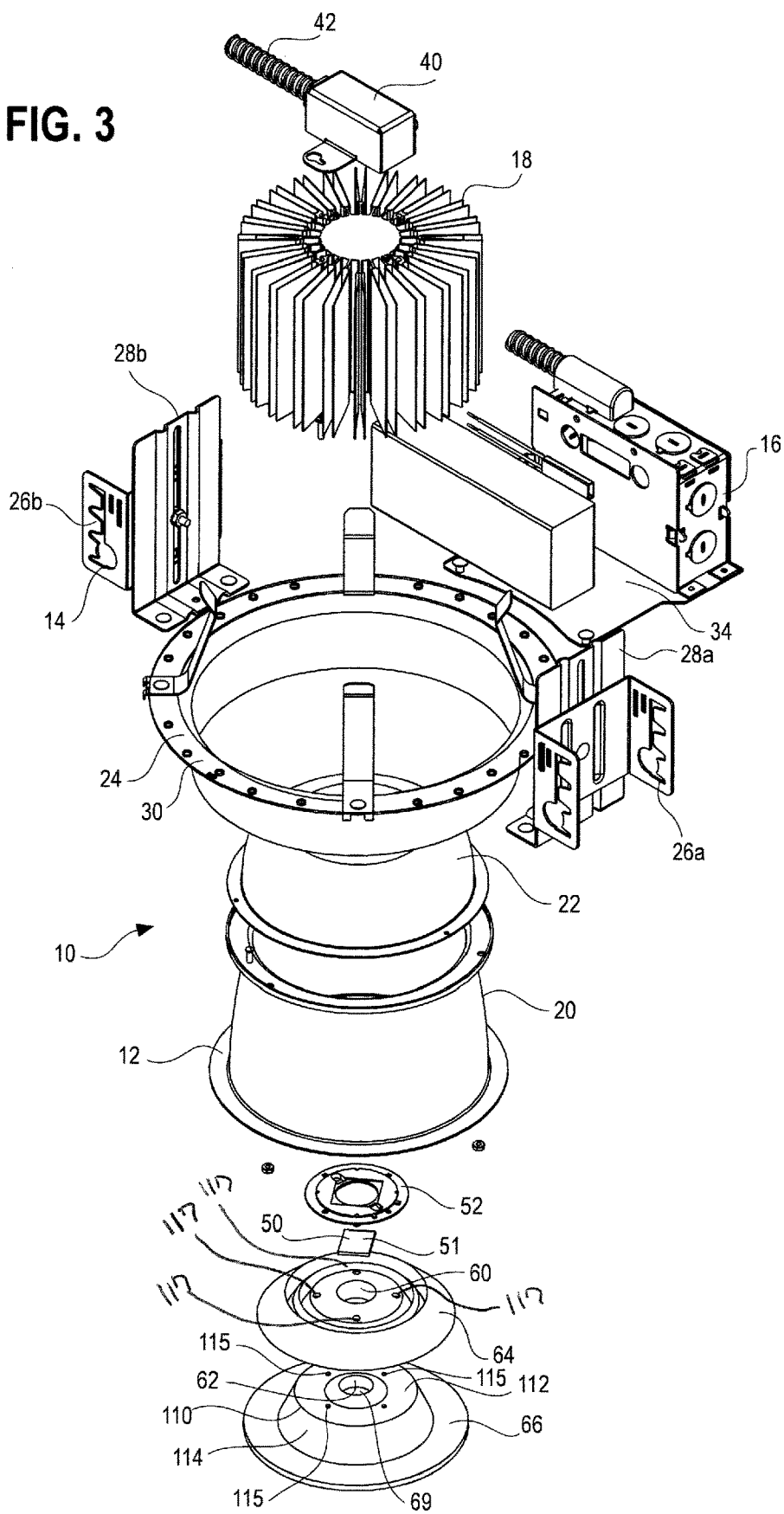
FIG. 3 is an exploded isometric view from above of the luminaire of FIGS. 1 and 2.

Referring to FIGS. 1-3, a luminaire 10 includes a housing 12, a mounting device 14 secured to the housing 12, a junction box 16, and a heat sink 18. The housing 12 comprises a reflector 20, a shield 22, and an extension ring 24 that are secured together in any suitable fashion, such as by fasteners (not shown), welds, brackets, or the like. The mounting device 14 may include conventional joist hangers 26a, 26b secured to two brackets 28a, 28b, respectively. The brackets 28a, 28b are, in turn, secured in any suitable fashion, such as by fasteners (not shown) to a flange 30 of the extension ring 24. The luminaire 10 may be suspended by fasteners extending through the joist hangers 26 into a structural member, such as one or more joists (not shown). Any other suitable support structure(s) could instead be used, including device(s) that allow the luminaire to be used in new construction or in retrofit applications.

The junction box 16 is mounted on a plate 34 that is, in turn, secured in any suitable fashion (again, e.g., by fasteners, not shown) to the flange 30. The heat sink 18 is mounted atop the shield 22. A light source junction box 40 is disposed on the heat sink 18 and is mounted thereon in any suitable fashion. A conduit 42 houses electrical conductors that interconnect component(s) in the light source junction box 40 with power supplied to the junction box 16.

A light source 50 comprising at least one light emitting diode (LED) element is firmly captured by a retention ring 52 and fasteners 56 (FIG. 2) and/or another fastening element(s), such as adhesive, against an undersurface 54 of the heat sink 18. The light source 50 may be a single white or other color LED chip or other bare component, or each may comprise multiple LEDs either mounted separately or together on a single substrate or package to form a module 51. One or more primary optics, such as one or more lenses, may be disposed over each LED or group of LEDs. Light developed by the light source 50 is directed downwardly as seen in FIGS. 2 and 3 and either travels directly through interior bores 58, 59 (FIGS. 2, 4, 4A, and 4B) or is directly incident on coupling surfaces 60, 62 of first and second optical waveguide stages or portions 64, 66, respectively, of an optical waveguide 68. The waveguide stages 64, 66 are secured to the heat exchanger 18 in any convenient fashion, such as by fasteners, adhesive, brackets, or the like, or is simply sandwiched together and firmly captured between a shouldered surface 61 and a base surface 63 of the shield 22.

As seen in FIGS. 2-4 and 4A, the coupling surface 60 extends entirely through an interior portion of the first stage 64 (i.e., the coupling surface defines a through-bore) and comprises a frustoconical surface. Further in the illustrated embodiment, and as seen in FIGS. 2-4 and 4B, the coupling surface 62 comprises a blind bore having a frustoconical shape and defined in part by a planar base portion 69 that also directly receives light from the light source 50. The coupling surfaces 60, 62 are preferably at least partially aligned, and in the illustrated embodiment, are fully aligned in the sense that such surfaces have coincident longitudinal axes 70a, 70b, respectively, (FIG. 2). Also preferably, the surfaces 60, 62 together form a combined frustoconical shape without substantial discontinuity at the interface therebetween, with the exception of an air gap 65 at an axial plane between the stages 64, 66. Alignment holes 117 may be provided to aid in alignment of the light source 50 with the first stage 64. Alignment holes 117 may contact or be attached to the retention ring 52 that captures the light source 50. An embodiment may provide protrusions on the retention ring 52 that are received by the alignment holes 117. Alternative embodiments may attach the retention ring 52 to the first stage 64 by way of a screw, bolt, fastener, or the like.

If desired, the coupling surface 62 may comprise a through-bore rather than a blind bore (such an arrangement is shown in FIGS. 5 and 6), although the latter has the advantage of providing an enclosed space to house and protect the light source 50.

Figure 4:
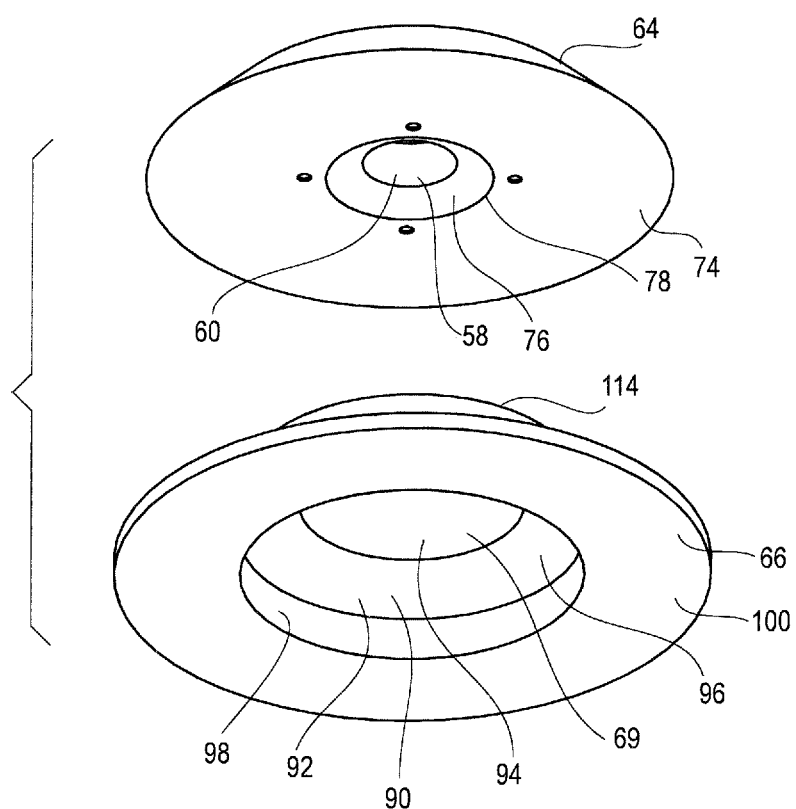
FIG. 4 is a fragmentary exploded isometric view from below of the waveguide stages of FIG. 3.
Figure 4A:
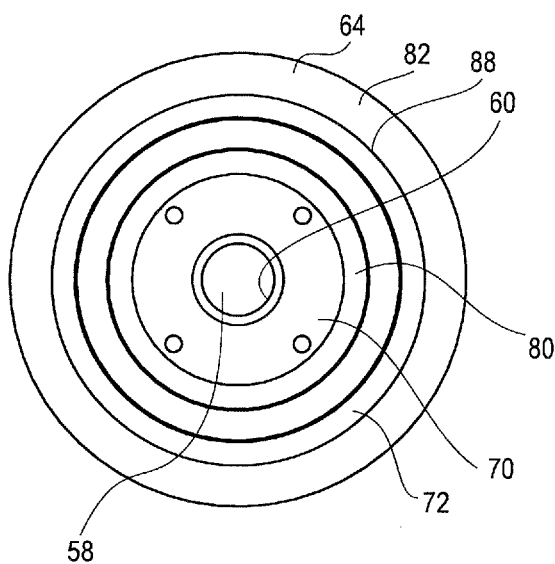
FIG. 4A is a plan view of the first waveguide stage of FIG. 4.

Referring next to FIG. 4A, the first and second stages 64, 66 are preferably circular in plan view and nested together. The first stage 64 further includes a light transmission portion 70 and a light extraction portion 72. The light transmission portion 70 is disposed laterally between the coupling surface 60 and the light extraction portion 72. As seen in FIG. 4, the first stage 64 further includes a substantially planar lower surface 74 and a tapered lower surface 76 that meet at an interface surface 78. Referring again to FIGS. 2 and 4A, the light extraction portion 72 includes light extraction or direction features 80, 82 and a light recycling portion or redirection feature 88 intermediate the light extraction features 80, 82.

Figure 4B:
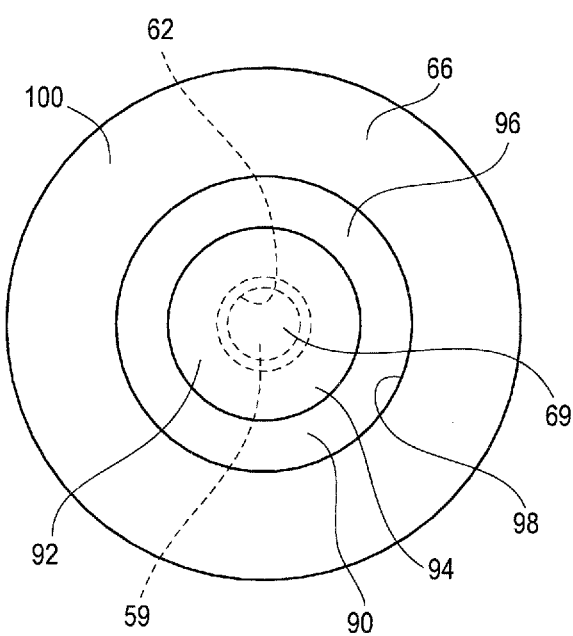
FIG. 4B is a bottom elevational view of the second waveguide stage of FIG. 4.

As seen in FIGS. 2, 4, and 4B, the second stage 66 includes a light extraction feature or portion 90 and a central cavity 92 defined by a lower planar base surface 94, a lower tapered surface 96, and a cylindrical surface 98. A planar circumferential flange 100 surrounds the light extraction feature 90 and the central cavity 92. The flange 100 facilitates retention of the stages 64, 66 in the luminaire and may enclose and protect the various components thereof. The flange 100 may not serve an optical function, although this need not be the case. In some embodiments, the first and second stages 64, 66 are disposed such that the light extraction portion 72 of the first stage 64 is disposed outside of the light extraction portion 90 of the second stage 66.

In one embodiment, the first stage 64 may include a first major surface with light extraction features 80, 82 and a second major surface opposite the first major surface. The second stage 66 may include a third major surface proximate the second major surface of the first stage 64 and a fourth major surface opposite the third major surface. The second and third major surfaces of the first and second stages 64, 66, respectively, may be disposed such that an air gap is disposed therebetween as described below. The central cavity 92 may extend into the fourth major surface of the second stage 66.

The light source 50 may include, for example, at least one phosphor-coated LED either alone or in combination with at least one color LED, such as a green LED, a yellow LED, a red LED, etc. In those cases where a soft white illumination with improved color rendering is to be produced, each LED module 51 or a plurality of such elements or modules may include one or more blue shifted yellow LEDs and one or more red LEDs. The LEDs may be disposed in different configurations and/or layouts on the module as desired. Different color temperatures and appearances could be produced using other LED combinations, as is known in the art. In one embodiment, the light source 50 comprises any LED, for example, an MT-G LED incorporating TrueWhite® LED technology or as disclosed in U.S. patent application Ser. No. 13/649,067, filed Oct. 10, 2012, entitled "LED Package with Multiple Element Light Source and Encapsulant Having Planar Surfaces" by Lowes et al., the disclosure of which is hereby incorporated by reference herein, as developed and manufactured by Cree, Inc., the assignee of the present application. If desirable, a side emitting LED disclosed in U.S. Pat. No. 8,541,795, the disclosure of which is incorporated by reference herein, may be utilized. In some embodiments, each LED element or module 51 may comprise one or more LEDs disposed within a coupling cavity with an air gap being disposed between the LED element or module 51 and a light input surface. In any of the embodiments disclosed herein each of the LED element(s) or module(s) 51 preferably has a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element(s) or module(s) may be used as the light source.

Still further, the material(s) of the waveguide stages 64, 66 are the same as one another or different, and/or one or both may comprise composite materials. In any event, the material(s) are of optical grade, exhibit TIR characteristics, and comprise, but are not limited to, one or more of acrylic, air, polycarbonate, molded silicone, glass, and/or cyclic olefin copolymers, and combinations thereof, possibly in a layered or other arrangement, to achieve a desired effect and/or appearance. Preferably, although not necessarily, the waveguide stages 64, 66 are both solid and/or one or both have one or more voids or discrete bodies of differing materials therein. The waveguide stages 64, 66 may be fabricated using any suitable manufacturing processes such as hot embossing or molding, including injection/compression molding. Other manufacturing methods may be used as desired.

Each of the extraction features 80, 82 may be generally of the shape disclosed in U.S. application Ser. No. 13/839,949, filed Mar. 15, 2013, entitled "Optical Waveguide and Lamp Including Same", owned by the assignee of the present application and the disclosure of which is incorporated by reference herein.

The first stage 64 is disposed atop the second stage 66 such that the substantially planar lower surface 74 and the tapered lower surface 76 of the first stage 64 are disposed adjacent an upper planar base surface 112 (FIGS. 2, 3, and 4) and an upper tapered surface 114 comprising a portion of the light extraction feature 90 of the second stage 66. Disposed at a location adjacent an interface 110 between the upper planar base surface 112 and the upper tapered surface 114 (FIG. 3) or at one or more points or areas where the first and second stages 64, 66 are adjacent one another is at least one protrusion that may be continuous or discontinuous and which may have an annular or other shape. In the illustrated embodiment of FIGS. 2, 3, 4, and 6 four protrusions 115 (seen in FIGS. 2, 3, and 6) extend from the upper planar base surface 112 of the second stage 66 and are received by four cavities 116 (two of which are seen in FIG. 3 and three of which are visible in FIG. 6), formed at least in the planar lower surface 74 of the first stage 64. A first height of each protrusion is slightly greater than a second height of each cavity such that an air gap 120 (FIG. 6) is maintained between the stages 64, 66. The air gap 120 may be of either constant thickness or varying thickness in alternative embodiments.

In general, the luminaire 10 develops a beam spread or beam angle of between about 10 degrees and about 60 degrees, and more preferably between about 10 degrees and about 45 degrees, and most preferably between about 15 degrees and about 40 degrees. The luminaire is further capable of developing a light intensity of at least about 2000 lumens, and more preferably a light intensity of about 4000 to about 15,000 lumens, and more preferably a light output of about 6000 lumens to about 10,000 lumens or higher. In the case of higher output luminaires, thermal issues may require additional features to be employed. The multi-stage nested waveguide optics separated by an air gap are employed to achieve high lumen output with low perceived glare and to allow a narrow luminaire spacing to luminaire height ratio to be realized. The luminaire 10 uses as little as a single light source and multiple optics. The luminaire 10 is particularly suited for use in applications where ceiling heights are relatively great, and where luminaires are to be spread relatively far apart, although the embodiments disclosed herein are not limited to such applications.

In the illustrated embodiments the shape and manufacture of each stage may contribute to the achievement of a desired beam angle. Desirable beam angles may include 15 degrees, 25 degrees, and 40 degrees. The first stage 64 may be machined with light extraction features 80, 82 and/or one or more light redirection features 88 having slightly different sizes and angles as seen in FIGS. 4C and 4D. Further, the first stage 64 and/or second stage 66 may be positioned in a selected relative alignment with respect to the light source 50 in order to obtain a desired beam angle. Varying the relative alignment of the first stage 64 and/or the second stage 66 with respect to the light source 50 allows more or less light to couple directly with the first stage 64 and/or the second stage 66. The variation in relative alignment may be in the transverse direction, the circumferential direction, or both.

Although all of the light transmission surfaces of both waveguide stages 64, 66 are polished in many embodiments, in alternate embodiments selected surfaces of the second stage 66 may be machined with texturing, for example, on the light output surfaces 94, 96, 98, 100. Such texturing may aid in diffusion of output light. One optional texturing is specified by Mold-Tech of Standex Engraving Group, located in Illinois and other locations in the U.S. and around the world, under specification number 11040. In order to apply the texturing to the light output surfaces 94, 96, 98, 100 of the second stage 66, the second stage 66 may be machined, molded, or otherwise formed as two pieces 156, 158. When formed as two pieces as shown in FIG. 4E, the first portion 156 may be polished and the second portion 158 may have the texturing applied to the respective surfaces. After the machine finish is completed for each piece, the second stage 66 may be assembled from the two pieces 156, 158 using acrylic glue or another suitable adhesive.

The waveguide configurations for obtaining 15, 25, and 40-degree beam angles may be created with different combinations of the above-described embodiments for the first and second stages 64, 66. Specifically, a 15 degree beam angle may be achieved by combining a polished second stage 66 with the first stage having the pattern of extraction and redirection features 80, 82, and 88, respectively, shown in FIG. 4C. A 25 degree beam angle may be achieved by combining the textured second stage 66, shown prior to final assembly in FIG. 4E, with the same first stage 64 feature pattern used in the 15 degree beam angle configuration. A 40-degree beam angle may be achieved by combining the textured second stage 66 with the first stage 64 having the extraction feature pattern shown in FIG. 4D.

FIGS. 5 and 6 are ray trace diagrams simulating the passage of light through the first and second stages 64, 66, respectively. Referring first to FIG. 5 the first stage 64 splits the light incident on the coupling surface 60 and/or traveling through the into groups of light rays. A first group 140 of such light rays travels through the interior bores 58, 59 and the planar base portion 69 and out the luminaire 10 with a minimal spread to develop a collimated central illumination distribution portion. A second group of light rays 142 is incident on the coupling surface 60, enters the first stage 64, strikes the first extraction feature 80, exits the first stage 64 in a collimated fashion, and is directed through the air gap 120 into the second stage 66. The second group of light rays 142 is refracted at the tapered surface 96 and exits the luminaire 10 to produce a collimated first intermediate annular illumination portion. A third group of light rays 144 originally incident on the coupling surface 60 totally internally reflects off surfaces of the first stage 64 comprising the substantially planar lower surface 74 at the index interface defining the air gap 120, and travels through the light recycling portion 88 where the light rays are refracted. The refracted light totally internally reflects off the light extraction feature 82 and travels out of the first waveguide stage 64. The lateral dimension of the first waveguide stage 64 is larger than a lateral dimension of the second stage 66 such that at least some of the light reflected off the light extraction feature 82 exits the first stage 64, passes through the planar circumferential flange 100 of the second stage 66 and out of the luminaire 10 to produce a collimated outer annular illumination portion. The first stage 64 thus splits a portion of the light developed by the light source 50 and collimates the light.

In the illustrated embodiment, the second stage 66 receives about 40%-50% of the light developed by the light source 50. Referring next to FIG. 6, a portion of the light developed by the light source 50 that is incident on the coupling surface 62 is refracted upon entering the stage 66 and totally internally reflects off surfaces of the second stage 66 including the planar lower base surface 94, the planar upper base surface 112, and/or the tapered lower surface 76, and is directed out the second stage 66 by the surface 114 of the extraction feature 90 to develop a collimated second intermediate annular illumination distribution portion 150.

The light extraction features 80, 82, and 90 are preferably (although not necessarily) annular in overall shape. Further, the outer surfaces thereof are preferably frustoconical in shape, although this also need not be the case. For example, any or all of the features 80, 82, 90 may have a curved outer surface, or a surface comprising a piecewise linear approximation of a curve, or another shape. Still further, the features 80, 82, 90 may overall be continuous or discontinuous, the features 80, 82, 90 may have a cross-sectional shape that varies or does not vary with length, etc.

The illumination distribution portions 140, 142, 144, and 150 together form an overall illumination distribution that is substantially uniform, both in terms of color and intensity, and has a beam spread as noted above. If desired, light diffusing features such as texturing, lenticular features, or radial bumps can be applied onto one or more corresponding optical features to reduce or eliminate imaging of the light produced by the individual LEDs. Still further, the surfaces of the reflector 20 may be shaped and coated or otherwise formed with a specular or other reflective material so that stray light beams are emitted downwardly together with the light beams forming the illumination distribution portions 140, 142, 144, and 150.

If desired one or both of the stages 64, 66 may be modified or omitted, and/or one or more additional stages may be added to obtain other illumination patterns, if desired.

Figure 7:
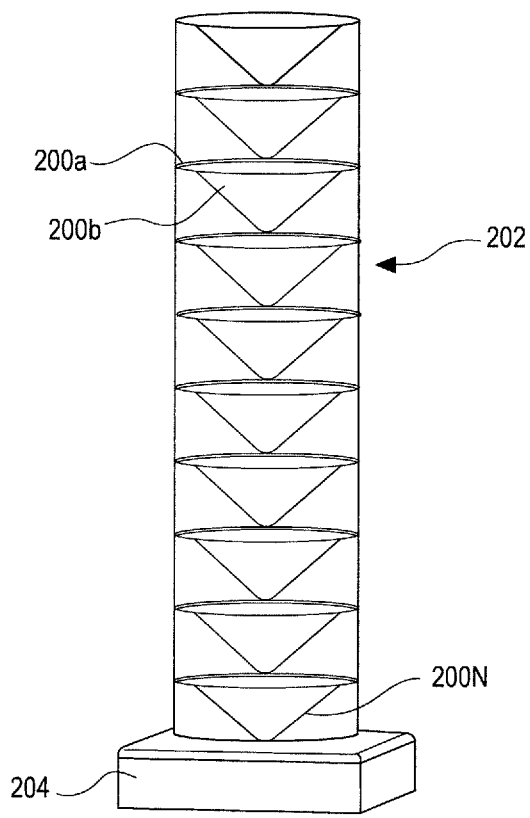
FIG. 7 is a side elevational view of another embodiment of a multi-stage waveguide.
Figure 8:
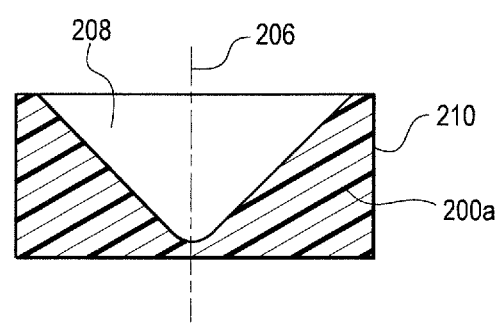
FIG. 8 is a sectional view of the stage 200a of FIG. 7.

Still further, referring to FIGS. 7 and 8, one could stack identical or different waveguide stages 200a, 200b, . . . , 200N atop one another to obtain a waveguide 202 that receives light from a light source, such as one or more LED elements or modules (not shown) disposed in a base 204 to obtain a light engine that develops an illumination distribution, for example, closely resembling or identical to a compact fluorescent lamp. In the illustrated embodiment, the stages 200 are substantially, if not completely identical to one another, and hence only the waveguide stage 200a will be described in detail herein. The stages 200 are maintained in assembled relationship by any suitable means such as acrylic glue, another adhesive, a bracket, one or more rods that are anchored in end plates, fasteners, etc., or a combination thereof.

The stage 200a is circular cylindrical in shape and has a central axis of symmetry 206. An internal cavity 208 is V-shaped in cross section and the stage is made of any of the optical materials disclosed herein. The internal cavity 208 may have an alternate cross-sectional shape, such as a parabola, a frustum, a conical shape, an elliptic paraboloid shape, a frustoconical shape, or a combination of shapes. The surface defining the internal cavity 208 may act as a light redirection feature. The internal cavity 208 forms an air gap within the waveguide. The air gap enables the surface defining the internal cavity 208 to re-direct light toward the exterior surface 210 of waveguide stage 200a. At least some of the redirected light may further be collimated upon said redirection.

The stage 200a may be a machined waveguide having all surfaces polished. Alternately, the exterior cylindrical surface 210 may be slightly diffused by roughening or scatter coating or texturing, potentially leading to a more uniform luminance appearance.

The base 204 may consist of a housing cap and a machined heatsink. The housing cap may optionally be made of plastic, such as the plastic varieties used in fused deposition modeling (FDM) or other suitable manufacturing processes. The light engine obtained from combining the base 204 and stacked waveguide stages 200a, 200b, . . . , 200N may be part of an arrangement within a downlight such as luminaires 212, 214 shown in FIGS. 9 and 10. A luminaire 212 having a vertical lamping position, as seen in FIG. 9, provides an intensity distribution resembling that of a similarly situated compact florescent lamp. A luminaire 214 having a horizontal lamping position, as seen in FIG. 10, provides a relatively wider intensity distribution, again resembling that of a similarly situated compact florescent lamp. However, in both lamping positions, luminaires 212, 214 described herein may provide better efficiency than a luminaire containing a comparable compact florescent lamp.

Any of the embodiments disclosed herein may include a power circuit for operating the LEDs having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al. incorporated by reference herein. The circuit may further be used with light control circuitry that controls color temperature of any of the embodiments disclosed herein in accordance with viewer input such as disclosed in U.S. patent application Ser. No. 14/292,286, filed May 30, 2014, entitled "Lighting Fixture Providing Variable CCT" by Pope et al. incorporated by reference herein.

Further, any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the light control circuitry includes at least one of a network component, an RF component, a control component, and a sensor. The sensor may provide an indication of ambient lighting levels thereto and/or occupancy within the room or illuminated area. Such sensor may be integrated into the light control circuitry.

INDUSTRIAL APPLICABILITY

In summary, each disclosed luminaire provides an aesthetically pleasing, sturdy, cost effective luminaire for use in general lighting. The lighting is accomplished with reduced glare as compared to conventional lighting systems.

The extraction features disclosed herein efficiently extract light out of the waveguide. At least some of the luminaires disclosed herein (perhaps with modifications as necessary or desirable) are particularly adapted for use in installations, such as, replacement or retrofit lamps, indoor products, (e.g., downlights, troffers, a lay-in or drop-in application, a surface mount application onto a wall or ceiling, etc.), and outdoor products. Further, the luminaires disclosed herein preferably develop light at a color temperature of between about 2500 degrees Kelvin and about 6200 degrees Kelvin, and more preferably between about 2500 degrees Kelvin and about 5000 degrees Kelvin, and most preferably between about 3000 degrees Kelvin and about 5000 degrees Kelvin. Also, at least some of the luminaires disclosed herein preferably exhibit an efficacy of at least about 60 lumens per watt, and more preferably at least about 75 lumens per watt. Further, at least some of the optical coupling members and waveguides disclosed herein preferably exhibit an overall efficiency (i.e., light extracted out of the waveguide divided by light injected into the waveguide) of at least about 90 percent. A color rendition index (CRI) of at least about 70 is preferably attained by at least some of the luminaires disclosed herein, with a CRI of at least about 80 being more preferable. Any desired particular output light distribution could be developed.

When one uses a relatively small light source which emits into a broad (e.g., Lambertian) angular distribution (common for LED-based light sources), the conservation of etendue, as generally understood in the art, requires an optical system having a large emission area to achieve a narrow (collimated) angular light distribution. In the case of parabolic reflectors, a large optic is thus generally required to achieve high levels of collimation. In order to achieve a large emission area in a more compact design, the prior art has relied on the use of Fresnel lenses, which utilize refractive optical surfaces to direct and collimate the light. Fresnel lenses, however, are generally planar in nature, and are therefore not well suited to re-directing high-angle light emitted by the source, leading to a loss in optical efficiency. In contrast, in the present embodiments, light is coupled into the optical stages, where primarily TIR is used for re-direction and collimation. This coupling allows the full range of angular emission from the source, including high-angle light, to be re-directed and collimated, resulting in higher optical efficiency in a more compact form factor.

Embodiments disclosed herein are capable of complying with improved operational standards as compared to the prior art as follows:

| | State of the art standards | Improved Standards Achievable by Present Embodiments |
| --- | --- | --- |
| Input coupling efficiency (coupling + waveguide) | 90% | About 95% plus improvements through color mixing, source mixing, and control within the waveguide |
| Output efficiency (extraction) | 90% | About 95%: improved through extraction efficiency plus controlled distribution of light from the waveguide |
| Total system | ~70% | About 80%: great control, many choices of output distribution |

In at least some of the present embodiments the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through each of the waveguide stages to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of optical features, such as coupling and/or extraction features, to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a lighting system utilizing a waveguide as described herein are not limited to any specific application and/or a specific light source.

The embodiments disclosed herein break light up into different portions that are controlled by separate stages that are axially stacked or offset, with or without an air gap therebetween, to develop a desired illumination distribution. While the embodiments disclosed herein do not utilize a light diverter in a coupling cavity to spread such light into the waveguide, and hence, the illumination distribution is limited by the size of the light source, one could use a light diverter to obtain a different illumination distribution, if desired.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. An optical waveguide, comprising:
a first waveguide portion; and
a second waveguide portion adjacent to and separate from the first waveguide portion;
wherein the first and second waveguide portions each comprise light coupling portions that are at least partially aligned and each light coupling portion is adapted to directly receive light developed by a light source;
wherein the light coupling portions comprise one or more interior coupling cavities;
wherein the first waveguide portion further comprises a first major surface with light direction features and a second major surface opposite the first major surface, the second waveguide portion further comprises a third major surface proximate the second major surface with an air gap disposed therebetween and a fourth major surface opposite the third major surface wherein the fourth major surface comprises an inner cavity extending therein to a flange surrounding the inner cavity;
wherein light is emitted from the flange and the inner cavity; and
wherein light exiting the second major surface is directed through the flange.

2. The optical waveguide, of claim 1, wherein the light direction features comprise two light extraction features and a light redirection feature.

3. The optical waveguide of claim 1, wherein the first waveguide portion receives light developed by a light source and the second waveguide portion receives light directed out of the second major surface of the first waveguide portion.

4. The optical waveguide of claim 1, wherein the fourth major surface is textured.

5. The optical waveguide of claim 1, wherein one of the first and second waveguide portions comprises at least one protrusion and the other of the first and second waveguide portions comprises at least one cavity that receives the at least one protrusion to create the air gap.

6. The optical waveguide of claim 1, wherein the first and second waveguide portions are configured to provide beam angles in a range of between 10 degrees and 60 degrees.

7. The optical waveguide of claim 1, disposed in a luminaire comprising an LED.

8. The optical waveguide of claim 1, wherein the inner cavity of the second waveguide portion is defined by a tapered surface and a planar base surface.

9. An optical waveguide, comprising:
a first waveguide stage comprising a first surface and a second surface opposite to the first surface and a first interior light coupling cavity in the first surface, a first light transmission portion and a first light extraction portion, and a second waveguide stage comprising a third surface and a fourth surface opposite to the third surface and a second interior light coupling cavity in the third surface, a second light transmission portion and a second light extraction portion, the first interior light coupling cavity and the second interior light coupling cavity being at least partially aligned, and wherein the second surface and the third surface face toward one another and are separated from one another by an air gap;
wherein the first light transmission portion is disposed between the first interior light coupling cavity and the first light extraction portion along a lateral dimension of the first waveguide stage, and the second light transmission portion is disposed between the second interior light coupling cavity and the second light extraction portion along a lateral dimension of the second waveguide stage;

wherein the first light extraction portion is disposed outside of the second light extraction portion along the lateral dimension of the second waveguide stage;

wherein the first interior light coupling cavity extends through the first waveguide stage from the first surface to the second surface and to the second interior light coupling cavity; and wherein a light emitting interior cavity is disposed in the fourth surface of the second waveguide stage such that the second interior light coupling cavity is aligned with the light emitting interior cavity.

10. The optical waveguide of claim 9, wherein the first light extraction portion comprises two light extraction features and a light redirection feature.

11. The optical waveguide of claim 9, wherein the first waveguide stage receives light developed by a light source and the second waveguide stage receives light directed out of the first waveguide stage.

12. The optical waveguide of claim 11, wherein the fourth surface is textured.

13. The optical waveguide of claim 11, wherein fourth surface is polished.

14. The optical waveguide of claim 11, wherein one of the first and second waveguide stages comprises at least one protrusion and the other of the first and second waveguide stages comprises at least one cavity that receives the at least one protrusion to create the air gap.

15. The optical waveguide of claim 9, wherein the first and second waveguide stages are configured to provide beam angles in a range between 10 degrees and 60 degrees.

16. The optical waveguide of claim 9, wherein the first and second waveguide stages are configured to provide beam angles in a range between 15 degrees and 40 degrees.

17. The optical waveguide of claim 9, disposed in a luminaire comprising an LED.

18. The optical waveguide of claim 9, wherein the light emitting interior cavity is defined by a tapered surface and a planar base surface.

19. A luminaire, comprising:
  a housing;
  an optical waveguide disposed in the housing, wherein the optical waveguide comprises first and second stages each comprising a light coupling portion in a first surface and a light emitting second surface and a light extraction portion surrounding the light coupling portion in a lateral direction, at least a portion of the light extraction portion of the first stage disposed outside the light extraction portion of the second stage along the lateral dimension; and
  a light source disposed in the housing and adapted to develop light that is directly incident on the light coupling portions of the first and second stages;
  wherein light incident on the light coupling portions of the first and second stages travels through the first and second stages and the light extraction portions of the first and second stages direct light out of the first and second stages, and wherein the first and second stages are disposed adjacent to one another such that a portion of the light emitted from the light emitting second surface of the first stage is directed into the first surface of the second stage;
  wherein the light coupling portion of the second stage comprises a surface transverse to the light coupling portion of the first stage; and
  wherein a light emitting interior cavity is disposed in the light emitting second surface of the second stage such that the light coupling portion of the second stage is aligned with the light emitting interior cavity.

20. The luminaire of claim 19, wherein the light extraction portion of the first stage comprises two light extraction features and a light redirection feature.

21. The luminaire of claim 19, wherein the light emitting second surface of the second stage is textured.

22. The luminaire of claim 19, wherein the light emitting second surface of the second stage is polished.

23. The luminaire of claim 19, wherein one of the first and second stages comprises at least one protrusion and the other of the first and second stages comprises at least one cavity that receives the at least one protrusion to create an air gap between the first and second stages.

24. The luminaire of claim 19, wherein the first and second stages are configured to provide beam angles in a range between 10 degrees and 60 degrees.

25. The luminaire of claim 19, wherein the first and second stages are configured to provide beam angles in a range between 15 degrees and 40 degrees.

26. The luminaire of claim 19, wherein the light source comprises at least one LED.

27. The luminaire of claim 19, wherein the light source comprises an LED module comprising a plurality of LEDs.

* * * * *

UNITED STATES PATENT AND TRADEMARK OFFICE
CERTIFICATE OF CORRECTION

PATENT NO. : 10,422,944 B2
APPLICATION NO. : 14/726152
DATED : September 24, 2019
INVENTOR(S) : Yuan et al.

Page 1 of 1

It is certified that error appears in the above-identified patent and that said Letters Patent is hereby corrected as shown below:

In the Claims

Column 14, Line 23, Claim 2: delete "waveguide," insert -- waveguide --

Signed and Sealed this
Tenth Day of December, 2019

Andrei Iancu
*Director of the United States Patent and Trademark Office*